United States Patent [19]
Hart et al.

[11] Patent Number: 5,450,782
[45] Date of Patent: Sep. 19, 1995

[54] VIBRATION DESENSITIZING PISTON WEAR RING FOR RAILROAD CAR CONTROL VALVE

[75] Inventors: James E. Hart, Trafford; Daniel G. Scott, Pittsburgh; Lawrence J. Andrews, Elizabeth, all of Pa.

[73] Assignee: Westinghouse Air Brake Company, Wilmerding, Pa.

[21] Appl. No.: 285,667

[22] Filed: Aug. 3, 1994

[51] Int. Cl.6 ............................................. F16J 15/18
[52] U.S. Cl. ................................. 92/165 R; 277/177
[58] Field of Search ............... 92/165, 168, 240, 242, 92/243, 244, 245; 277/168, 184, 225, 174, 177

[56] References Cited

U.S. PATENT DOCUMENTS

| | | | |
|---|---|---|---|
| 3,068,054 | 12/1962 | Schmidt et al. | 92/243 |
| 4,540,182 | 9/1985 | Hoult | 277/174 |
| 4,875,405 | 10/1989 | Bernhardt et al. | 92/240 |
| 5,050,892 | 9/1991 | Kawai et al. | 277/177 |
| 5,088,744 | 2/1992 | Oseman | 277/177 |

FOREIGN PATENT DOCUMENTS

| | | | |
|---|---|---|---|
| 8807621 | 10/1988 | European Pat. Off. | 92/243 |
| 1132308 | 3/1957 | France | 92/243 |

OTHER PUBLICATIONS

*Encyclopedia of Plastics* p. 64 Dated Dec. 1989.

*Primary Examiner*—Thomas E. Denion
*Attorney, Agent, or Firm*—Gary J. Falce

[57] ABSTRACT

A piston valve assembly in which plastic wear rings are fitted on an aluminum piston member to prevent metal-to-metal engagement between the piston member and the bore of the bushing in which the piston member is operatively disposed in order to eliminate abrasion of the piston member due to vibration in the bushing bore.

20 Claims, 2 Drawing Sheets

VIBRATION DESENSITIZING PISTON WEAR RING FOR RAILROAD CAR CONTROL VALVE

BACKGROUND OF THE INVENTION

The present invention is related to improved railroad car brake control valves and particularly to such improvements as relate to the adverse effects of vibration on piston valves and the like.

Railroad car brake control valves, such as ABD, ABDW and ABDX valves, presently employ piston operated valves comprising a piston member that operates in a bushed bore and a slide valve member that is carried by the piston member for controlling the pneumatic porting between the slide valve face and the mating face of a slide valve seat formed in the bushing. The slide valve/seat interface requires a very close, lapped-fit. A special lubricant is provided to assure controlled, low friction movement of the slide valve and piston. Diaphragm operated pistons are employed, and a close fit is also provided between the piston member guides and the generally cylindrical piston bush in order to support and guide the piston member in the bushing bore.

With the trend toward light-weight railroad cars, such as aluminum coal hopper cars, for example, relatively severe vibration can occur when such light-weight cars are operated under less than ideal dynamic conditions. Wheel surface irregularities including out-of-roundness, worn truck components, and rail conditions are believed to contribute to such dynamic operating conditions that result in severe vibration of the brake control valve on the car.

Under conditions in which severe vibration is encountered, vibration can be transmitted to the piston member. Presently, the piston member employed in the industry standard ABD, ABDW, and ABDX type brake control valves is made of die cast aluminum, while the bushing in which the piston member operates is brass. Such high levels of vibration as are sufficient to induce vibration of the piston member can cause excessive wear of the piston member guide due to progressive abrasion. Such abrasive wear of the aluminum piston member has been found to cause general contamination of the piston and slide valve with a fine, oxidized aluminum powder resulting from the accumulation of particulates of aluminum formed by the abrasion of the piston guides. This residue tends to absorb the slide valve lubricant which also increases slide valve friction and causes high piston operating pressure differentials and consequent erratic and unacceptable behavior of the aforementioned control valves.

SUMMARY OF THE INVENTION

The principle object of the invention is to insulate and protect the aluminum piston members from such vibration as otherwise causes abrasive wear of the piston member guide surfaces.

Another object of the invention is to provide means for supporting and guiding a piston member in the piston bushing while controlling sliding friction with less dependence on fluid lubricants.

Another object of the invention is to insulate a piston member from induced vibration without degrading control valve performance.

Briefly, these objectives are carried out by a piston assembly for a railroad car brake control valve device comprising a diaphragm operated piston member having at least one annular groove in the periphery thereof, a bushing having a bore in which the piston member is coaxially disposed with an annular gap therebetween, and at least one non-metallic flexible ring member carried on the periphery of the piston member comprising an annular rib received by the annular groove of the piston member and an annular head portion from which the rib depends, the head portion extending laterally in opposite direction from the rib and projecting into the gap between the piston member and bore to provide a bearing surface contiguous therewith for guidably supporting the piston member without direct contact between the piston member and bore.

BRIEF DESCRIPTION OF THE DRAWINGS

These and other objects and advantages of the invention will become apparent from the following more detailed explanation when taken in conjunction with the accompanying drawings in which.

DESCRIPTION AND OPERATION

Figure 1:
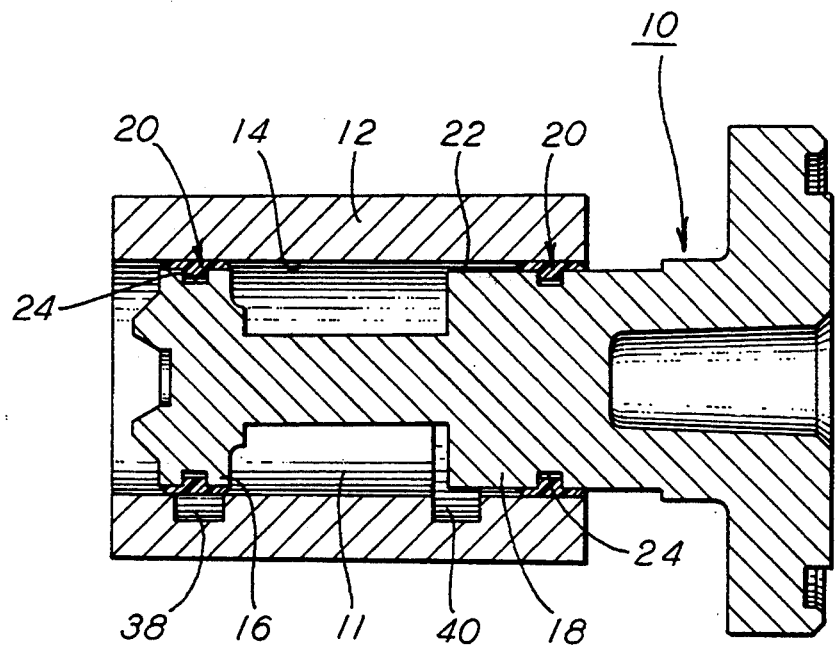
FIG. 1 is a section view showing cooperating bushing and piston members, the latter having a wear ring installed on the piston guides.

Referring now to FIG. 1, there is shown a piston member 10 and a bushing 12 having a bore 14 in which the piston member is disposed for axial displacement. Piston member 10 may be a diaphragm operated type such as the service and emergency pistons employed in conventional railroad car brake control valve devices of the well known ABD, ABDW and ABDX type manufactured by the Westinghouse Air Brake Co. Typically, these piston members 10 carry a slide valve (not shown) in a recess 11 formed between the piston guides 16, 18. A close fit between the piston guides 16, 18 and bore 14 heretofore served the purpose of supporting and guiding the piston member in bushing 12, with metal-to-metal contact between the piston guides and bushing 12 causing the vibration induced wear problem hereinbefore discussed.

In accordance with the present invention, the piston members 10 have been modified to accept a plastic wear ring 20 at each piston guide 16, 18. This piston modification includes reducing the diameter of the piston guides so that an annular gap 22 is formed between the piston member 10 and bushing bore 14, and forming a groove 24 in the periphery of the respective piston guides.

Figure 2:
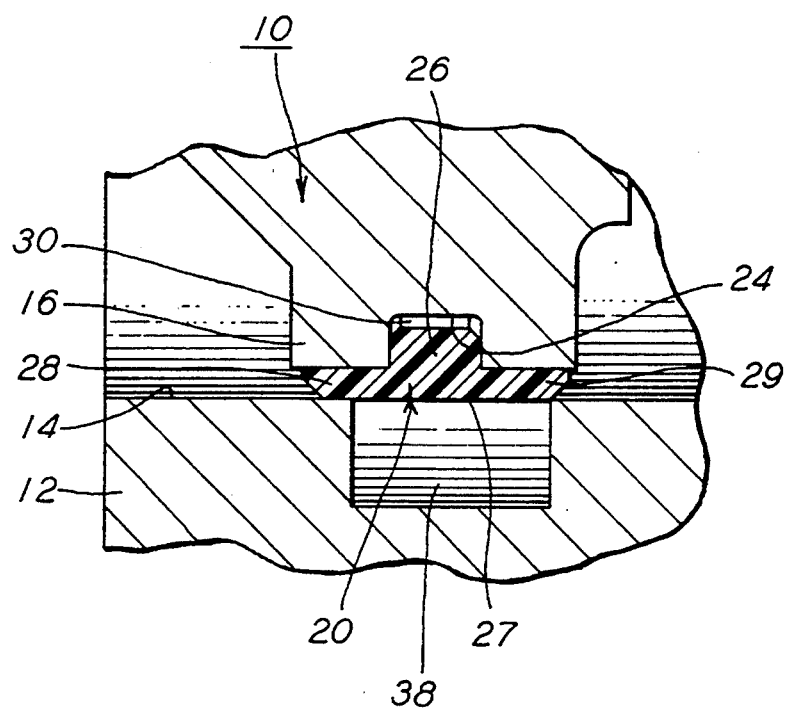
FIG. 2 is an enlarged partial section view of the installed wear ring of FIG. 1.

As most clearly shown in FIG. 2, wear ring 20 is generally T-shaped in cross-section, having a central rib 26 that is received in groove 24 and a head portion 27 in the form of a pair of wings 28, 29 that extend in opposite directions from rib 26. Head portion 27 including wings 28, 29 projects into gap 22 and provides an annular cylindrical bearing surface engageable with bore 14. The width of groove 24 in the respective piston guides 16, 18 and the width of rib 26 are substantially the same so that the axial location of wear rings 20 on the piston guides is fixed. The thickness of wear ring 20 at wings 28, 29 is slightly less than the size of gap 22 and being substantially less than the thickness of the wear ring at rib 26, thereby minimizes the effects of thermal expansion and contraction of the wear ring in gap 22 between the piston member and bore. The thickness of wings 28, 29 is preferably between 0.038 and 0.040 inches. A gap 30 is provided between the base of groove 24 and the end of rib 26 to accommodate thermal expansion of the wear ring in an inward direction. Since the coefficient of thermal expansion and contraction is generally proportional to the cross-section thickness, it will be appreciated that the outer dimension of the plastic wear ring formed by the relatively thin section wings 28, 29 is relatively unaffected by changes in temperature. Consequently, the clearance required between the bushing bore 14 and wear ring 20 is minimized and the piston member 10 is accordingly supported in bore 14 with a closer fit and better guide than would otherwise be possible. This is most desirable from the standpoint of preventing piston cocking and binding and ring wear. Rib 26 may be beveled to facilitate its assembly in groove 24 and wings 28, 29 may also be beveled for ease of assembly of piston member 10 into bore 14 and to accommodate such assembly without damage to the wear rings.

Figure 4:
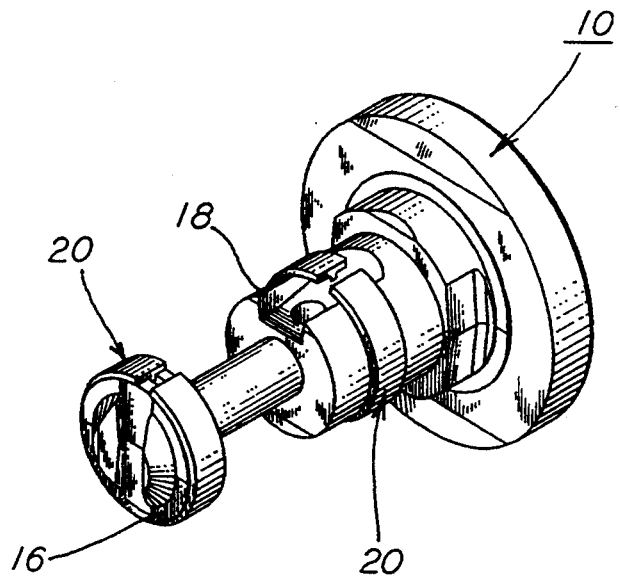
FIG. 4 is an isometric view showing a piston member of a conventional ABD, ABDW or ABDX brake control valve with the preferred wear ring installed.
Figure 3:
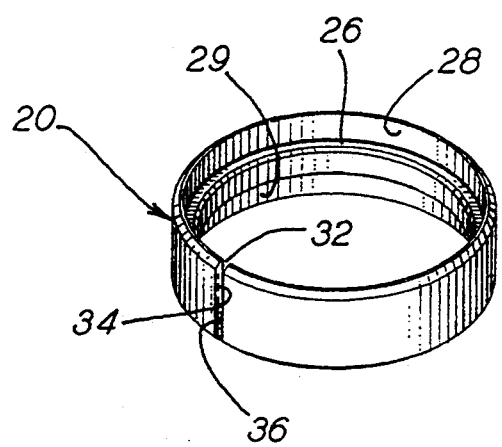
FIG. 3 is an isometric view of the preferred wear ring.

Referring now to FIGS. 3 and 4, it will be seen that wear ring 20 is non-continuous, having a separation 32 formed by counterposed ends 34, 36 that are spaced-apart from each other in the free-state of wear ring 20. Separation 32 allows for outward flexure of ends 34, 36 in order to assemble wear rings 20 over the piston guides 16, 18. In addition, the inner diameter of the wear ring wings 28, 29 is less than the outer diameter of piston guides 16, 18. In actual practice, a service piston and an emergency piston associated with the aforementioned control valves have different diameter piston guides on which a wear ring 20 is assembled. Preferably, the inside diameter of the wear ring adapted for assembly with the service piston is about 1.622 inches and its outside diameter is about 1.700 inches. Also, the inside diameter of the emergency piston wear ring is preferably 1.121 inches and its outside diameter is 1.199 inches. The diameter of the periphery of the service and emergency piston guides is 1.663–1.665 inches and 1.135–1.137 inches respectively. It will be further appreciated, therefore, that following assembly of wear ring 20 on piston member 10, wings 28, 29 engage the periphery of the piston guides without returning to a normal unflexed or free state. Consequently, wear rings 20 establish a snug fit on the periphery of piston member guides 16, 18 and due to the force of flexure of the fit, automatically compensate for changes in thermal expansion therebetween to further prevent the wear rings from loosening and possibly causing piston binding and ring wear. The separation 32 between ends 34, 36 is sufficient to prevent the wear ring ends from abutting in response to thermal expansion of the wear ring, it being understood that if the wear ring ends were to abut, any further thermal expansion would result in the wear ring diameter increasing, with consequent loosening of the wear ring on piston member 10.

Returning now to FIG. 2, it will be seen that bushing 12, as employed in the aforementioned ABD, ABDW, and ABDX type brake control valve devices, is provided with eccentric unloader slots 38, 40 that extend partially around bore 14, the width of these slots being substantially the same. The purpose of these unloader slots is to attain a desired air load on the piston slide valve (not shown). As can be seen in FIG. 2, the width of wear rings 20 is greater than the width of slots 38, 40 by a predetermined overlap that is sufficient to provide a bearing area capable of supporting the piston member at guides 16, 18 under a worse case condition in which the piston location in bore 14 is such that either end of wear rings 20 is aligned with a corresponding side of slots 38, 40. This not only facilitates piston assembly by preventing the piston member 10 from cocking and binding due to the edge of either one of the wear rings dropping into an unloader slot as the piston member is pushed into the busing bore during assembly, but also assures at least a predetermined minimum bearing support at both piston guides 16, 18 as the wear rings traverse the unloader slots, during subsequent operation of piston member 10.

Preferably, plastic wear rings 20 are made of ultrahigh molecular weight polyethylene, which exhibits such desirable characteristics as high abrasion resistance and impact strength, as well as good residual lubricity. With piston member 10 installed and in a static state, wear rings 20 serve to insulate piston member 10 from induced vibration and at the same time physically isolate the aluminum body of piston member 10 from engagement with bushing 12. Being thus less susceptible to vibration and free from metal-to-metal contact, piston member 10 is less prone to wear due to abrasion of piston guides 16, 18. Accordingly, the accumulation of lubrication absorbing residue resulting from such abrasion is eliminated. Therefore, subsequent displacement of piston member 10 at a desired operating differential is achieved over an extended service period, so that when operating a slide valve, more consistent and reliable control valve performance is realized. The inherent lubricity of the ultrahigh molecular weight polyethylene piston wear rings 20 further enhances control valve performance. Moreover, the unique design of wear rings 20 allows displacement of piston member 10 to occur without wear rings 20 themselves becoming loose and wearing prematurely or even breaking due to thermal expansion and contraction.

I claim:

1. A piston assembly for a railroad car brake control valve device comprising:
   a) a piston member having at least one annular guide and an annular groove in the periphery of said guide;
   b) a bushing having a bore in which said piston member is coaxially disposed, the periphery of said piston guide having a diameter less than the diameter of said bore such that a generally annular gap is formed between the periphery of said piston guide and said bore;
   c) at least one annular, non-metallic, flexible ring member carried on the periphery of said piston guide, said ring member having a T-shaped cross-section comprising;
      (i) an annular rib disposed within said at least one annular groove; and
      (ii) an annular head portion from which said rib depends, said head portion comprising a pair of annular wings extending laterally in opposite directions from said rib and projecting into said annular gap to provide a bearing surface conforming to and contiguous with said bore on which said piston member is guidably supported without engagement with said bore.

2. A piston assembly as recited in claim 1, wherein said at least one ring member further comprises a pair of counterposed ends formed by a separation that extends generally in the direction of the axis of said at least one ring member to thereby accommodate annular flexure of said at least one ring member.

3. A piston assembly as recited in claim 2, further characterized in that the diameter of the inner periphery of said wings of said head portion is less than the diameter of the periphery of said at least one piston guide in a free state of said at least one ring member prior to assembly thereof on said piston member.

4. A piston assembly as recited in claim 3, wherein said counterposed ends are spaced-apart from each other a predetermined distance in a free state of said at least one ring member prior to assembly thereof on said piston member.

5. A piston assembly as recited in claim 4, wherein said predetermined distance said counterposed ends are spaced-apart is at least 0.015 inches.

6. A piston assembly as recited in claim 1, wherein the radial thickness of said head portion is slightly less than said gap.

7. A piston assembly as recited in claim 1, wherein the depth of said at least one annular groove is greater than the length of said rib such that a space is formed between the base of said groove and the bottom of said rib.

8. A piston assembly as recited in claim 1, wherein said at least one annular groove comprises two spaced-apart annular grooves each having one said ring member disposed therein.

9. A piston assembly as recited in claim 1, further characterized in that the width of said rib within said at least one annular groove provides such a close fit therebetween as to fix the axial location of said ring member on said piston member.

10. A piston assembly as recited in claim 1, wherein said bushing includes at least one circumferential slot formed in said bore having a predetermined width, the axial dimension of said head portion being greater than said predetermined width of said at least one slot.

11. A piston assembly as recited in claim 10, wherein said oppositely extending head portion is formed with beveled ends.

12. A piston assembly as recited in claim 1, wherein the outside diameter of said at least one ring member is about 1.70 inches and the inside diameter thereof is about 1.62 inches.

13. A piston assembly as recited in claim 1, wherein the outside diameter of said at least one ring member is about 1.20 inches and the inside diameter thereof is about 1.12 inches.

14. A piston assembly as recited in claim 1, wherein the inside diameter of said head portion is about 1.62 inches.

15. A piston assembly as recited in claim 1, wherein the inside diameter of said head portion is about 1.12 inches.

16. A piston assembly as recited in claim 1, wherein the radial thickness of said head portion is between about 0.035 and 0.045 inches.

17. A piston assembly as recited in claim 1, wherein the diameter of the periphery of said piston member is about 1.664 inches.

18. A piston assembly as recited in claim 1, wherein the diameter of the periphery of said piston member is about 1.136 inches.

19. A piston assembly as recited in claim 1, wherein said ring member is plastic having an inherent lubricity.

20. A piston assembly as recited in claim 1, wherein said ring member is an ultrahigh molecular weight polyethylene plastic.

* * * * *